June 18, 1968  R. M. VAUGHN  3,388,411
METHOD AND APPARATUS FOR FORMING UNDERCUT SCREW HEAD SLOTS
Filed Jan. 14, 1966

INVENTOR.
RUDOLPH M. VAUGHN
BY
*Elliott & Pastoriza*
ATTORNEYS

United States Patent Office 3,388,411
Patented June 18, 1968

---

3,388,411
METHOD AND APPARATUS FOR FORMING UNDERCUT SCREW HEAD SLOTS
Rudolph M. Vaughn, 2172 Saltair Drive,
Santa Ana, Calif. 92705
Filed Jan. 14, 1966, Ser. No. 520,727
1 Claim. (Cl. 10—10)

ABSTRACT OF THE DISCLOSURE

A method is provided for forming an undercut slot in the head of a screw. This is accomplished by forming the screw head with raised portions bordering on a modified diverging slot structure formed in the head and then flatening the top surface of the head to cause the raised portions to expand laterally and thereby define the desired undercut slot with diverging side wall.

---

This invention relates generally to a method and apparatus for forming screw head slots and more particularly to an improved method and apparatus for forming an undercut slot in a screw head for cooperation with a high torque driver member.

To enable a high torque to be applied to a slotted screw head or bolt, the slot has generally been designed with undercut sidewalls to prevent camming of the driver edges of the screw driver out of the slot. The driver itself may be provided with diverging driving sidewalls to correspond substantially to the undercut portions of the slot walls. A slotted screw head of the foregoing type is fully described in my United States Patent No. 2,667,985 and a desired type of driver for such screw head slot is shown and described in my United States Patent No. 2,808,087.

In the above-noted patents, the slotted screw heads and drivers are designed such as to enable full surface contact between the driving surfaces of the driver itself and the slot walls. By this arrangement, the forces exerted on the sidewalls of the slot are distributed over a relatively large area.

In an improved version of a screw driver for use in slotted screw heads of the type described in my United States Patent No. 2,677,985, the driver walls diverge as before but constitute modified non-planar surfaces to effect an initial engagement on slot sidewalls at the central portion of the screw head. As increased torque is applied, the sidewalls of the screw slot will yield until eventually full surface contact is achieved. By employing such an improved type of driver, a higher torque is possible. Such improved screw driver is described in my United States Patent No. 2,994,354 for "Improved Screw Driver."

As a consequence of the capability of the screw head slot sidewalls to yield under high torque, it is not always essential for many applications that the undercut sidewalls of the screw head slot define perfect non-planar undercut surfaces, such as as shown in my above referred to United States Patent No. 2,677,985. Any deviations from the type of surface which yields full surface contact will not be serious, provided that the slots are still undercut and include diverging sidewalls, such deviations yielding to the high torque applied by a driver so that eventually full surface contact is realized.

Thus, for many applications, it is not required that the non-planar slot sidewalls be manufactured with the precision required for certain special applications. In these latter special instances, the provision of the undercut non-planar slot sidewalls generally requires a series of milling operations which is time consuming and expensive. It would be desirable if the advantages of a high torque screw slot could be achieved and yet the forming of the slot itself simplified to the end that high torque screws could be manufactured more rapidly and thus more economically than heretofore possible.

One means for more rapidly and economically manufacturing a screw head is by a cold heading process wherein a single header member is caused to strike the head of the screw and thereby form the slot. With such a member, it is possible to form a slot with diverging sidewalls, although the sidewalls themselves are not undercut. However, by using a high torque driver, the inner lower marginal ends of the slot adjacent the bottom will yield to be formed into an undercut configuration when a high torque is applied to the driver. Such type of slot formed with a single header member is described in United States patent application Ser. No. 16,531, filed Mar. 21, 1960, and entitled "Screw Head Slot," now abandoned.

While heading operations in forming screw head slots are known in the art, there is not any obvious means of forming an undercut slot by heading operation. If such could be achieved, the desirable feature of being able to form high torque screw head slots in a rapid and economical manner could be realized.

More particularly, it is an object to provide a screw head slot having undercut sidewalls wherein simple cold heading operations are carried out on the screw head as opposed to expensive and time consuming milling operations, all to the end that a more rapid and economical manufacturing of the screw head slot structures can be realized.

Another important object is to provide an apparatus for carrying out the successive method steps to provide a high torque screw head slot having diverging undercut sidewalls for use with high torque screw drivers such as shown and described in my above referred to United States Patent No. 2,808,087 and with my improved modified driver structure shown and described in my other above referred to United States Patent No. 2,994,354.

Briefly, these and many other objects and advantages of this invention are attained by employing a series of cold heading operations on the head of a screw. In accordance with the preferred method of the invention, the head of the screw is first shaped into an upraised convex surface having a transverse slot with an arcuate bottom and straight parallel sidewalls. The head of the screw is then modified to flatten the head and form the slot with diverging sidewalls having uprised marginal portions adjacent the upper marginal edges of the diverging sidewalls. Finally, the head is flattened to cause the upraised portions adjacent the upper marginal edges of the slot to expand laterally and thereby define an undercut slot.

The preferred apparatus in accordance with the present invention comprises first, second, and third header members having suitable impact surfaces designed to shape the head of the screw and slot in the manner described.

A better understanding of the invention will be had by now referring to the preferred embodiment thereof as illustrated in the accompanying drawings, in which.

Figure 1:
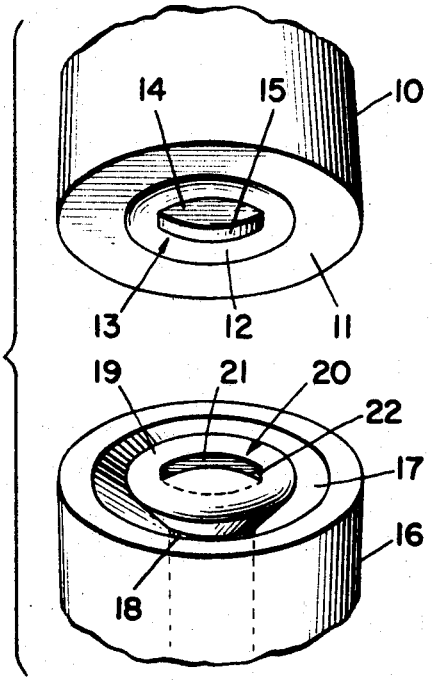
FIGURE 1 is a fragmentary perspective view illustrating a first header member and a die for holding a screw for carrying out a first step of the method in forming an undercut screw head slot.

Referring first to FIGURE 1, there is illustrated in fragmentary form in the upper portion of the drawing a first header member 10 having an impact surface 11 including a concave surface portion 12. A first protruding transversely extending slot forming member, designated generally by the numeral 13, is positioned in the central portion of the concave surface 12 and includes straight parallel sidewalls, one of which is visible at 14, and an end surface of convex arcuate shape as indicated at 15.

Cooperating with the header member 10 is a die 16 having a conical recessed portion 17 receiving the head of a screw 18. The head of the screw 18 is designated 19 and is shown after the header member 10 has impacted the screw head, which initially is in the form of a simple blank. It will be noted that the screw head 19 is formed by the concave surface 12 of the header member 10 into an upraised convex surface including a transverse slot, designated generally by the numeral 20, having parallel sidewalls, one of which is indicated at 21 and an arcuate bottom 22 conforming to the first slot forming member 13 of the header member.

It should be understood in FIGURE 1 that the shaping of the head of the screw 18 into the upraised convex surface 19 with the slot 20 is such that the convex top surface 19 of the screw head extends above the plane of the die 16.

Figure 2:
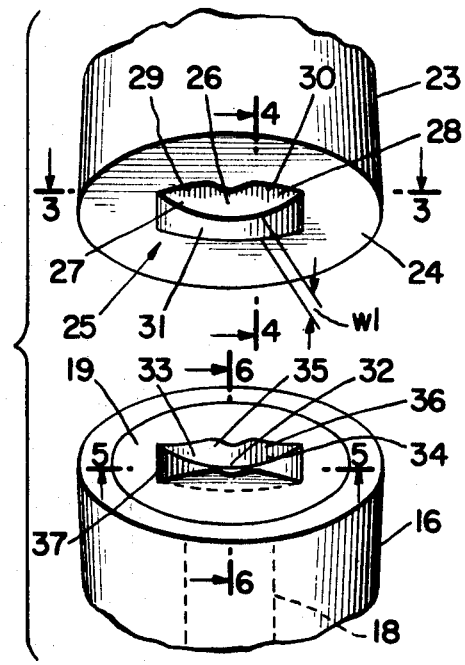
FIGURE 2 is a view similar to FIGURE 1 showing a second header member for modifying the screw head and slot structure of FIGURE 1.

Referring now to FIGURE 2, there is shown a second header member 23 having a flat impact surface 24 and a second protruding, transversely extending, slot forming member designated generally by the numeral 25. As shown, the slot forming member 25 includes a flat sidewall in its central area 26, the sidewall then diverging as at 27 and 28. Further, the flat impact surface 24 includes recessed areas 29 and 30 at the intersection of the diverging wall portions 27 and 28 of the slot forming member 25 defining therewith marginal cavities, the purpose for which will become clearer as the description proceeds. The member includes an arcuate end surface 31. In the perspective view of FIGURE 2, it is to be understood that the other side of the protruding slot forming member 25 has similarly shaped sidewalls merging into marginal cavities formed in the impact surface 24.

After the second header member 25 has impacted the screw head surface 19 of FIGURE 1, the screw head will have a configuration as shown in the die 16 below the second header member 25 in FIGURE 2. Thus, the modified screw head slot has flat central sidewall portions such as 32 and diverging sidewalls such as indicated at 33 and 34. Further, because of the cavities 29 and 30 described in the second header 23, there result raised portions 35 and 36 along the upper marginal edges of the diverging sidewalls 33 and 34. The bottom of the modified slot is arcuate as indicated at 37 to correspond with the convex arcuate end surface 31 of the second slot forming member 25.

It will be evident from the foregoing description of the second header member 23 and its associated second slot forming member 25 that the resulting slot structure will assume a bow-tie configuration when viewed normal to the top surface 19 of the screw. The slot forming member itself, when viewed normal to the impact surface 24, will also have a bow tie configuration.

The foregoing step in the method of modifying the slot of FIGURE 1 into a slot having diverging sidewalls with upraised marginal portions constitutes an extremely important step of this invention. The exact configuration resulting from the impacting of the second header member 23 with the top surface 19 of the screw head will be better understood by referring to the various cross sections in FIGURES 3, 4, 5, and 6 wherein the numerals employed correspond to the same numerals used in FIGURE 2.

Figure 3:
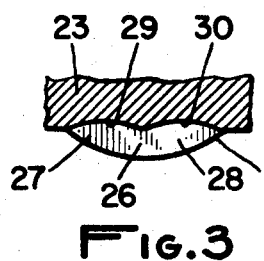
FIGURE 3 is a fragmentary cross section taken in the direction of the arrows 3—3 of FIGURE 2.
Figure 4:
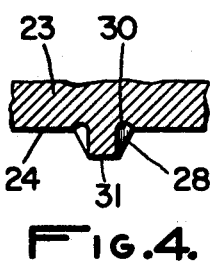
FIGURE 4 is another fragmentary cross section taken in the direction of the arrows 4—4 of FIGURE 2.

Thus, in FIGURE 3, the flat central portion of the sidewall of the second slot forming member in the second header 23 is shown at 26 and the diverging sidewall portions at 27 and 28 with their associated marginal cavities 29 and 30. In the cross section taken at 90° of FIGURE 4, the recessed areas defining marginal cavities such as the cavity 30 will be clear.

Figure 5:
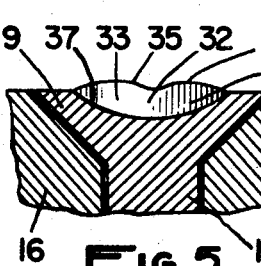
FIGURE 5 is a third fragmentary cross section taken in the direction of the arrows 5—5 of FIGURE 2.
Figure 6:
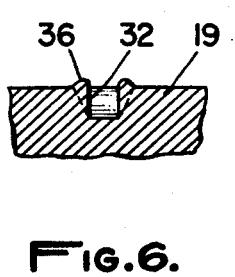
FIGURE 6 is a fourth fragmentary cross section taken in the direction of the arrows 6—6 of FIGURE 2; and, FIGURE 7 illustrates in perspective view a third header member for completing the formation of the undercut screw head slot.

In the cross sections of FIGURES 5 and 6 relating to the actual slot formed in the screw head, the configuration of the upraised portions 35 and 36 will be clear.

Figure 7:
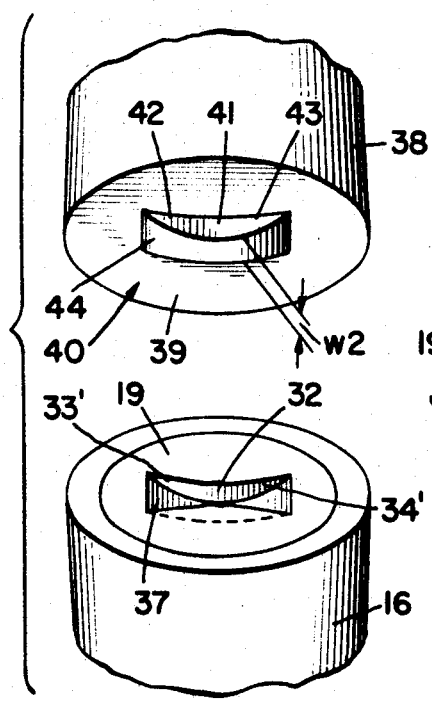

Referring now to FIGURE 7, the final step in the formation of the undercut screw head slot will be understood. In FIGURE 7, there is shown a third header member 38 having a flat impact surface 39 and a protruding transversely extending third slot forming member 40. The slot forming member 40 has a sidewall including a flat central portion 41 and diverging wall portions 42 and 43. Again, this third slot forming member, when viewed normal to the impact surface 39, has a bow-tie configuration. However, the width between the diverging sidewalls indicated at W2 in FIGURE 7 is less than the width of the diverging sidewalls indicated at W1 in FIGURE 3.

As a consequence, after the header member 38 has impacted the screw head configuration described in FIGURES 2-6, the upraised portions are caused to expand laterally and thus provide the desired undercut sidewalls as indicated at 33' and 34' in FIGURE 7. In other words, the raised portions along the upper marginal edges of the slot expand inwardly towards each other as a consequence of the lesser width of the third slot forming member 40. This arrangement permits the third slot forming member 40 to be withdrawn from the screw head slot and yet there still results the desired undercut sidewalls.

While the undercut sidewalls of the completed screw head illustrated in FIGURE 7 are not necessarily nonplanar surfaces of the type described in my referred to United States Patent No. 2,677,985, the slot configuration is sufficiently close that a high torque driver may readily be employed, any deviations from the exact desired surface as described in the above patent yielding under the high torque of the driver itself. The essential features of diverging and undercut sidewalls are preserved in the finished screw formed in accordance with the present invention so that insertion of a high torque driver and torquing of the screw can be carried out.

In the actual mass production of screws, the first, second, and third header members 10, 23, and 38 may be provided on a turret assembly and automatically actuated to impact the screw head successively, the same die 16 being employed in all instances. Alternatively, the die 16 may be caused to move in a linear manner beneath three serially spaced header members. In either event, the manufacture of the screw head slot can be carried out far more rapidly with a consequent savings in costs than by milling operations as have heretofore been required to form the screw head slots.

From the foregoing description, it will thus be evident that the present invention has provided a greatly improved method and apparatus for forming undercut screw slots in which the various objectives set forth are fully realized.

What is claimed is:

1. A method of forming an undercut slot in the head of a screw, comprising the steps of: cold heading said head of said screw with a first header member designed to shape said head into a convex, up-raised surface formed with a slot having straight flat sidewalls and an arcuate bottom; cold heading said slot and head with a second header member designed to modify said slot to define diverging sidewalls, and flatten the top surface of said head except for raised portions bordering the diverging upper edges of the modified slot; and then cold heading said head with a third header member designed to flatten the top surface of said head to cause said raised portions to expand laterally and thereby define an undercut slot with diverging sidewalls.

References Cited

UNITED STATES PATENTS 2,182,092  12/1939  O'Leary _____ 10—10
2,304,704  12/1942  O'Leary _____ 10—10 XR LEONIDAS VLACHOS, *Primary Examiner.*